May 19, 1953     W. B. DOLPH     2,638,980
PROGRAM CONTROL APPARATUS
Filed June 18, 1952     6 Sheets-Sheet 1

INVENTOR
William B. Dolph
BY Bacon & Thomas
ATTORNEYS

May 19, 1953 W. B. DOLPH 2,638,980
PROGRAM CONTROL APPARATUS
Filed June 18, 1952 6 Sheets-Sheet 3

INVENTOR
*William B. Dolph*

BY *Bacon & Thomas*
ATTORNEYS

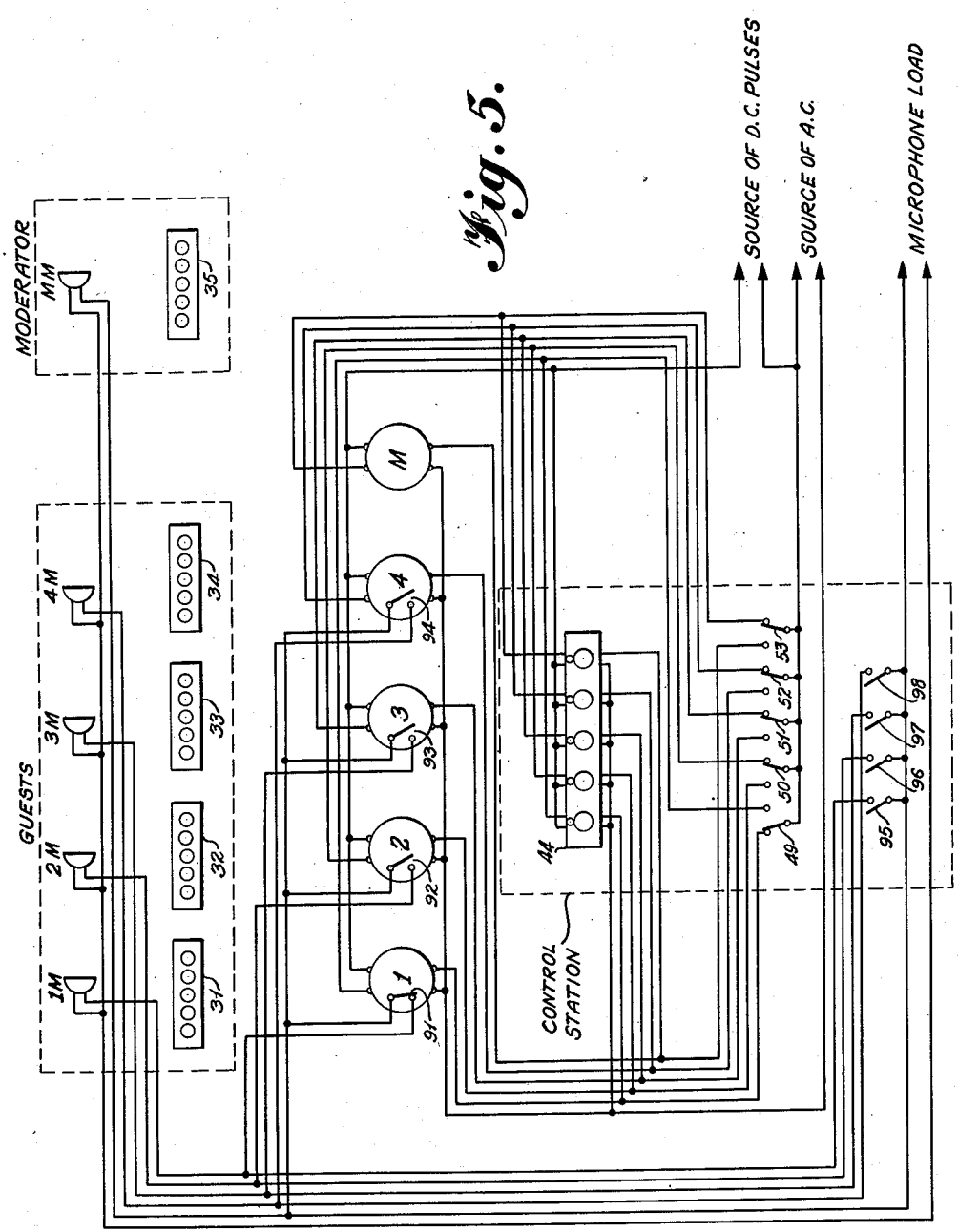

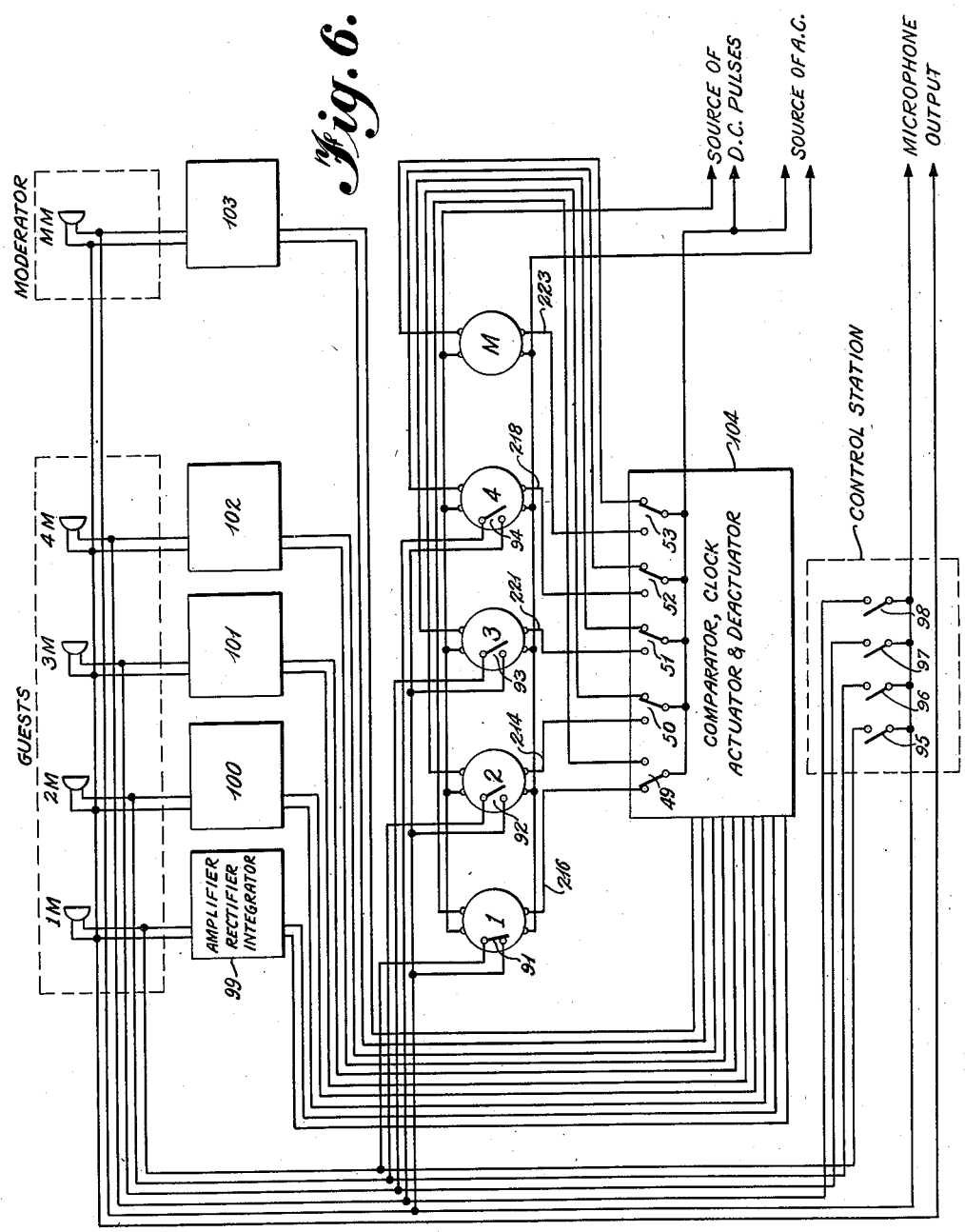

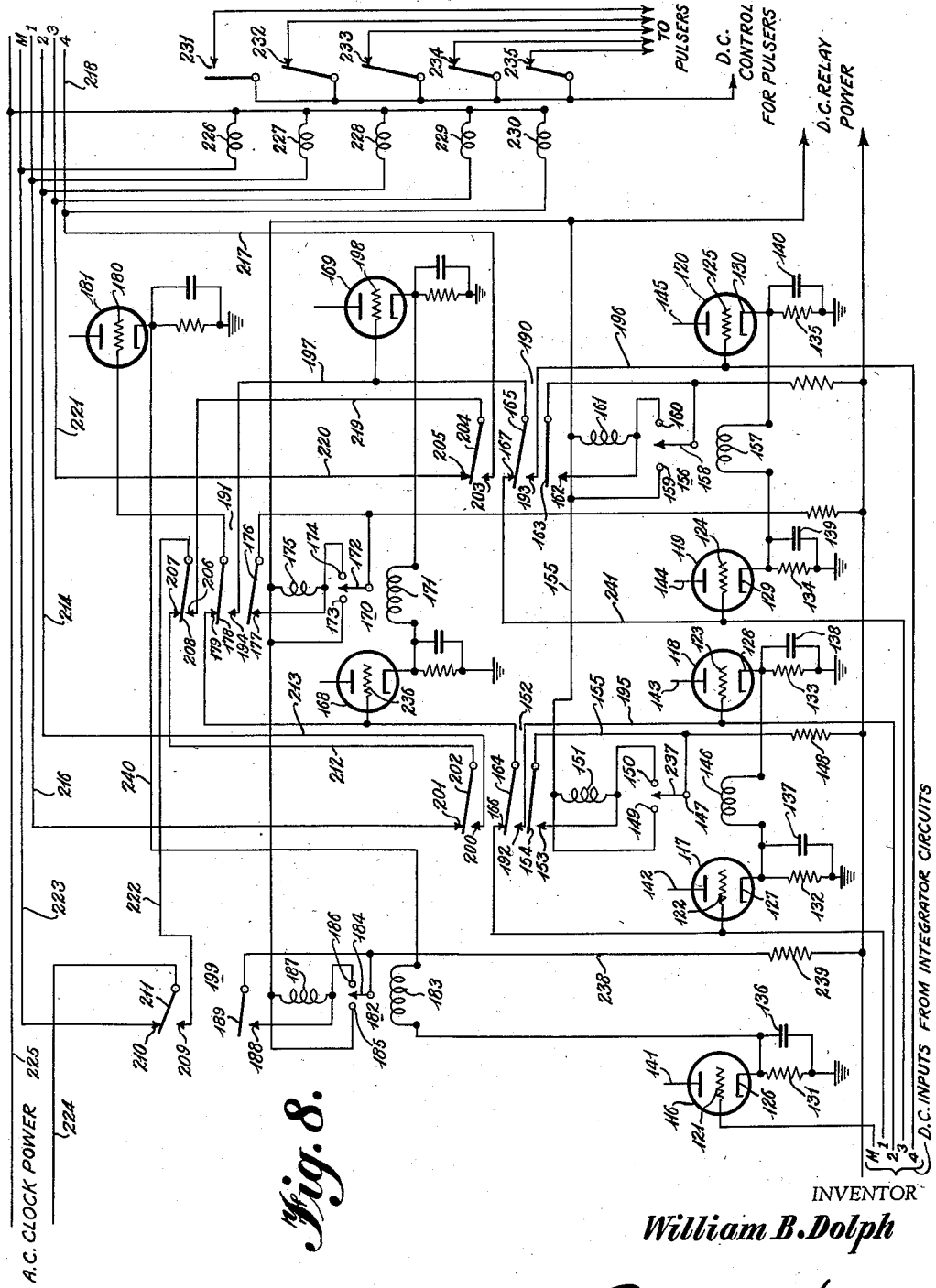

Patented May 19, 1953

2,638,980

UNITED STATES PATENT OFFICE 2,638,980

PROGRAM CONTROL APPARATUS

William B. Dolph, Washington, D. C.

Application June 18, 1952, Serial No. 294,210

16 Claims. (Cl. 161—17)

This invention relates to a program control apparatus, and more particularly to an apparatus for allotting equal predetermined total periods of actuation to a plurality of microphones which may be actuated at will, so that the overall total period of actuation of all of the microphones will always be a predetermined constant.

Whereas in radio and television programs of the forum or debate type, it is ordinarily expected that all guests or participants will be allowed equal periods of time in which to present their views and in which to contradict the assertions of other guests, in practice the guests more often than not repeatedly interrupt one another, with the common result that one or more of the guests or participants has utilized more than his share of the total time to the detriment of one or more other guests or participants. Anyone familiar with this type of program has undoubtedly witnessed the abortive efforts of the moderator or master of ceremonies to control such monopolization of time, and it is quite obvious that a perfectly equitable distribution of time by this means is impossible.

While it is desirable that each guest be allowed to present his arguments and to rebut his opponents' arguments for a time exactly equal to that used by his opponent, yet it is not desirable completely to eliminate the lively discussion which results when guests with opposing viewpoints are allowed to answer a particular argument without waiting for the termination of a set period of time. In short, it is highly desirable that the guests be allowed to interrupt one another so long as the total time used by all guests is equal.

A program which is conducted in the foregoing manner would enjoy the widespread public acceptance now accorded forum-type programs, and would undoubtedly enjoy even greater popularity in view of the equitable manner in which the contestants were handled and in view of the "clock-watching" attitude which would be induced on the part of the participants and the audience. A participant, after once having found that his total time had been used and his microphone was no longer energized, would on his next appearance attempt to save some of his time so as to be certain of a last rebuttal argument.

It is an object of this invention to provide a device which will cause a plurality of microphones to be energized for equal predetermined total periods of actuation, the microphones being actuatable at will by the participants, so that the sequential overall period of actuation of all microphones will total a predetermined duration of time.

It is a further object of this invention to provide such an apparatus wherein the program will be always conducted within its time limits and wherein one microphone will always be energized and actuated.

It is a further object of this invention to make the time period allotted each participant visible to the audience so that they may tell at a glance how much remaining time each participant has.

It is also an object of this invention to make such times visible to the participants so that they may determine at a glance the time remaining to themselves and to each of their opponents.

It is a further object of this invention to provide large stylized clocks which will run only during the time that the microphone associated with the clock is energized and actuated.

It is another object of this invention to insure that one and only one such clock is running at all times.

It is a further object of this invention to provide an apparatus which will deenergize each microphone as its associated clock indicates that the participant's allotted time has expired.

Another object of the invention is to provide a clock for the moderator or master of ceremonies which is visible to the audience, although no provision is made for deenergizing his microphone.

The characteristics of the invention which are considered novel are set forth with particularity in the appended claims. The invention itself, however, both as to its organization and method of operation, together with additional objects and advantages thereof, will best be understood from the following description of specific embodiments when read in connection with the accompanying drawings, in which:

Figure 4:
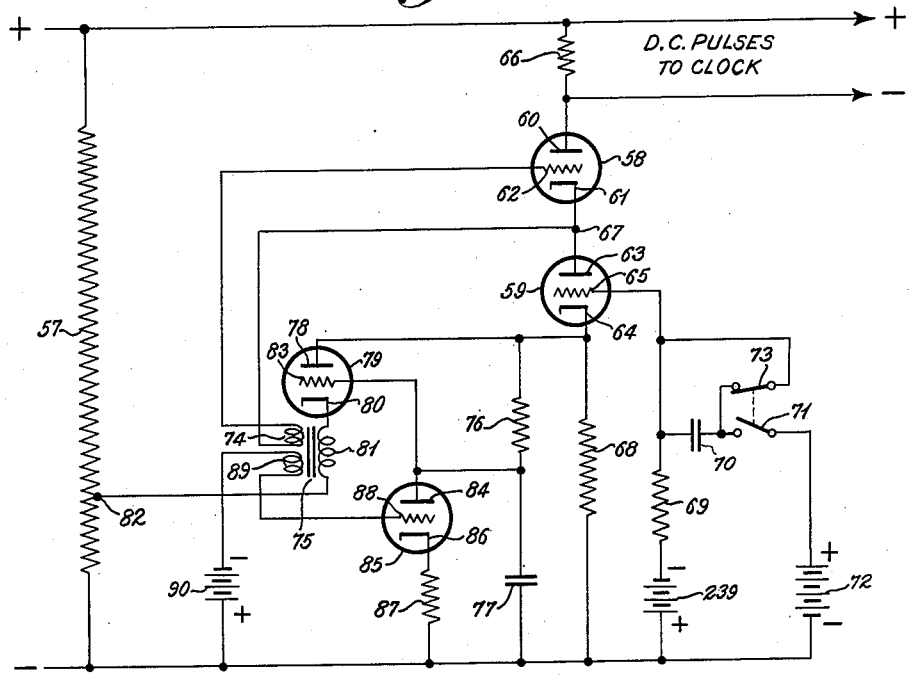
Figure 7:
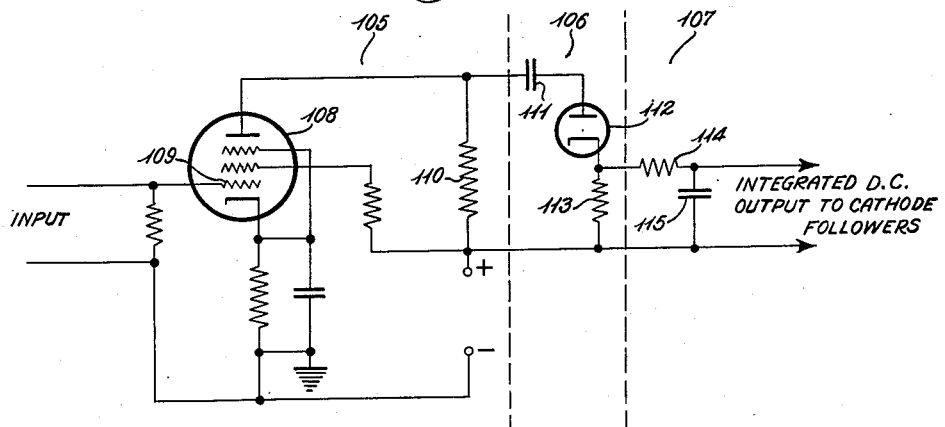

Figure 4 is a circuit diagram of a pulsing apparatus for use with the clocks of the invention, Fibure 5 is a circuit diagram of another embodiment of the invention, Figure 6 is a circuit diagram of still a further embodiment of the invention, Figure 7 is a circuit diagram of a microphone amplifier and integrator to be used with the embodiment of the invention shown in Figure 6, and Figure 8 is a circuit diagram of a comparator and clock actuator and deactuator device for use with the embodiment of the invention shown in Figure 6.

Figure 1:
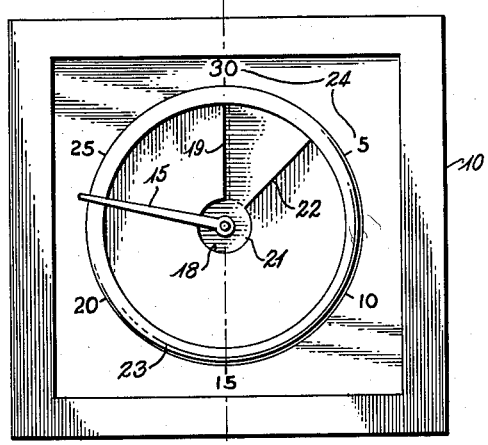
Figure 1 is a front view of one of the large clocks used in the invention.
Figure 2:
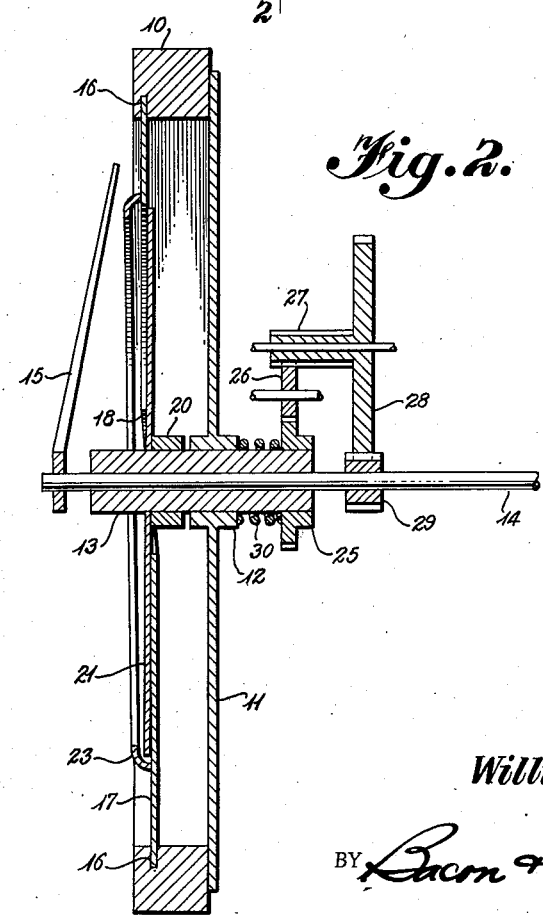
Figure 2 is a vertical cross section taken on line 2—2 of Figure 1.

The clock shown in Figures 1 and 2 is of such a size and design as to be readily readable by a large audience, and is adapted to be so placed in association with a particular guest or participant as to be visible to the audience and readily associated with that participant. The clock comprises an outer rectangular frame 10 upon which is mounted a bearing plate 11 which has formed integral therewith a bearing 12. Journaled in bearing 12 is a sleeve 13 which rotatably carries clock drive shaft 14 which is actuated by any suitable clock motor, not shown. The drive shaft 14 rotates at one revolution per minute and carries on its outer extremity the usual second hand 15. Mounted within longitudinal slots 16 in frame 10 is a face plate 17 of a thin, relatively flexible material having a center aperture 18 and a radial vertical slit 19. Affixed to a collar 20 on sleeve 13 is a disc 21 also constructed of thin relatively flexible material and also having a radial slot 22 which matches with the slot 19 in face plate 17. The collar 20 is keyed to sleeve 13 but is free to slide longitudinally thereon. Prior to the start of a program, the disc 21 is manually rotated clockwise so that the part of the disc to the right of slot 19 in Figure 1 passes over the outer face of face plate 17 so as to present a pie-shaped sector of a color contrasting with the color of face plate 17 thereby to indicate the time allotted to the participant associated with the clock. It is in order to eliminate as much friction as possible that the face plate 17 and disc 21 are constructed of thin flexible material and that the collar 20 is made longitudinally slidable on sleeve 13. As disc 21 is manually rotated clockwise, the collar 20 will move slightly forward or to the left as shown in Figure 2. As the clock is actuated and diminishes the pie-shaped sector visible to the audience, the collar will move in the opposite direction or to the right as seen in Figure 2. Circumferentially of the edge of disc 21 is provided a quarter-round guard 23 which hides the edge of disc 21 and which may, if desired, carry bearings which would separate disc 21 from face plate 17 to further eliminate friction. Outwardly of guard 23 are provided numerals 24 which indicate the time remaining. Keyed or pinned to the inner or right end of sleeve 13 is a gear 25 which meshes with a gear 26 in turn driven by a pinion 27 which is formed integral with a reduction gear 28. The gear train 25, 26, 27 and 28 is driven by a pinion 29 fastened to drive shaft 14. A coil spring 30 is provided on sleeve 13 to urge gear 25 into its rearward position as shown. Setting the clock is accomplished by grasping the outer end of sleeve 13 and pulling it forward against the force of spring 30 thereby disengaging gear 25 from gear 26 so that disc 21 may be rotated to the desired position.

Figure 3:
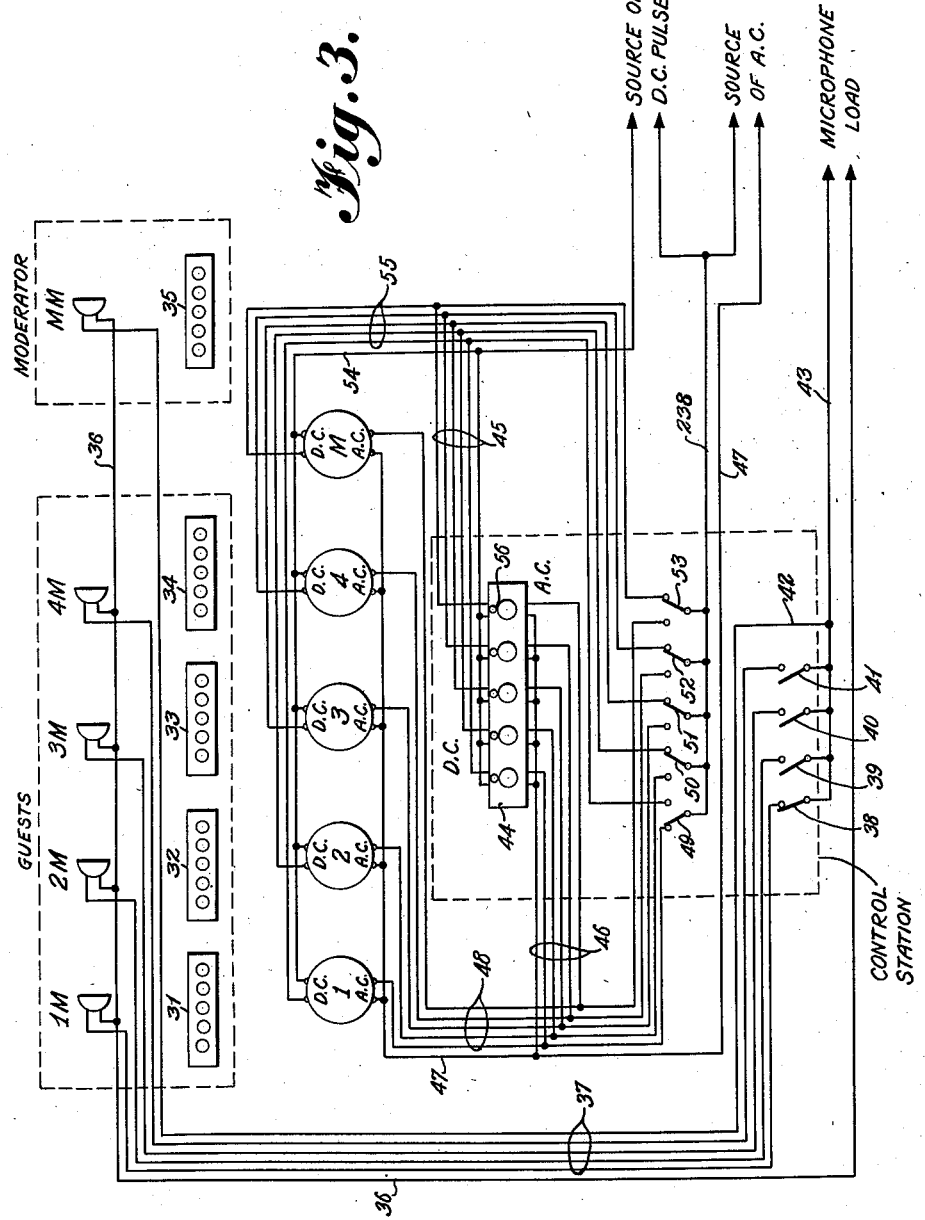
Figure 3 is a circuit diagram of one embodiment of the invention.

In Figure 3 is shown a circuit diagram of one embodiment of the invention including five large clocks designated 1, 2, 3, 4 and M, which clocks are associated with five microphones 1M, 2M, 3M, 4M and MM, one microphone and large clock for each participant, and one microphone and large clock for the moderator. In addition, each participant, including the moderator, is provided at his position with a set of five small clocks 31, 32, 33, and 34, and 35, which small clocks operate in synchronism with the large clocks and make visible to the participants the time remaining to themselves and to each other participant. All of the clocks involved are of the type which are actuated by single phase alternating current and which are stopped by disconnecting the alternating current and providing a braking pulse of direct current in a known manner.

One terminal of each microphone is connected to a common connection 36 which terminates in the microphone output load, while the other terminal of each microphone is connected by means of leads 37 to a group of control switches 38, 39, 40 and 41, the lead 42 from the moderator's microphone being connected to a microphone output lead 43 without going through a switch. The other sides of switches 38, 39, 40 and 41 are connected together to microphone output lead 43 which terminates in the microphone load, so that on closing the switch associated with a particular microphone, that microphone is energized and is ready to be actuated by its participant.

The switches 38, 39, 40 and 41 are grouped together at a control station or panel which also includes a set of small clocks 44, which clocks are connected in parallel with large clocks 1, 2, 3, 4 and M by means of trunks 45 and 46 supplying direct and alternating current power respectively. The small clocks 31, 32, 33 and 34 and 35 are also connected in parallel with large clocks 1, 2, 3, 4 and M by means of similar trunk lines, omitted here for the sake of diagram simplicity. One of the alternating current terminals of each of the large clocks 1, 2, 3, 4 and M is connected by means of connection 47 to a source of alternating current supply, while the other alternating current terminals of said clocks are connected by means of trunk 48 to one set of contacts of a series of single pole double throw switches 49, 50, 51, 52 and 53. The single poles of switches 49, 50, 51, 52 and 53 are connected by means of connection 238 to the other terminal of the source of alternating current for the clocks. The switches 49, 50, 51, 52 and 53 are provided in a unit and are of that type which allow the closure of only one switch at a time, i. e., the closure of an alternating current circuit by closure of one switch opens any other switch which might be closing any other alternating current circuit. One of the direct current terminals of each clock 1, 2, 3, 4 and M is connected by means of connection 54 to the control terminal of a source of direct current pulses. The other direct current terminals of said clocks are connected by means of trunk 55 to the second contacts of switches 49, 50, 51, 52 and 53, and the single poles of said switches is connected by means of the connection 238 to the other control terminal of the source of direct current pulses. Each small clock in the group 44 on the controller's panel is provided with an indicating light 56 which flashes on when its associated clock indicates that the particular participant's time has expired.

The operation of the device is as follows:

The controller at the control station initiates the program by closing all switches 38, 39, 40 and 41, thereby energizing microphones 1M, 2M, 3M, and 4M, the moderator's microphone MM being energized at all times. Normally the moderator will start the program with an introductory speech or a commercial and his clock switch 53 will be thrown by the controller to its left or energized position. This will actuate the moderator's clock M and will open the actuating circuits to clocks 1, 2, 3 and 4 should any of them be closed. When the moderator designates a particular participant to start the discussion, the controller will throw the appropriate clock switch 49, 50, 51 or 52 to its left or actuated position, thereby actuating that participant's clock, as shown for clock 1 in Figure 1. When that participant stops speaking or is interrupted by a second participant, the controller will actuate the clock of such second participant, or of the moderator in the event that there has been no interruption and the original speaker has merely stopped talking, and this actuation will open the alternating current supply to the original clock and will at the same time apply a direct current braking pulse to that clock.

It will be recognized that the controller, in the event that two or more participants are speaking at the same time, has the option of charging that time to that participant whom he thinks ought rightly be charged. This selection of clocks may be based on the loudness of the speaker's voice, upon refusal to yield the floor, upon frequent interruptions, or other considerations which will become apparent, much to the amusement of the audience.

When the time allotted to a particular participant has expired, the indicating light 56 on the controller's desk will indicate this fact, as will the clocks 44, the large clocks 1, 2, 3, 4 and M, and the small clocks 31, 32, 33, 34 and 35 on the participants' desks, and the controller will thereupon open the microphone switch 38, 39, 40 or 41 associated with that clock, thereby de-energizing that participant's microphone. Thereafter, although the moderator may be unable to prevent such disqualified participant from talking, the speech will be inaudible to the audience both in the studio and in the home, where the program is either heard on the radio or seen on television.

If it so happens that the participants have not used all of their time, the moderator may bring about further discussion by designating particular participants and asking questions designed to instigate further participation. The commercial on the program would, of course, by charged against the moderator's time.

In Figure 4 is shown the circuit diagram of a suitable device for producing the direct current pulses needed to brake the clocks. This apparatus comprises a voltage divider 57 which is connected across a source of direct current, not shown, and which in turn has connected across it two series discharge valves 58 and 59. The valve 58 is of the high vacuum type and has an anode 60, a cathode 61 and a control electrode 62. The valve 59 is of the arc-like type and has an anode 63, a cathode 64 and a control electrode 65. The anode of valve 58 is connected through a load resistor 66 to the positive end of voltage divider 57. The cathode 61 of valve 58 is connected by means of connection 67 to the anode of arc-like valve 59, while the cathode 64 of arc-like valve 59 is connected through a resistor 68 to the negative end of voltage divider 57, completing the anode circuits of valves 58 and 59. The control electrode 65 of arc-like valve 59 is maintained negative by means of a bias potential 239 which is connected to said control electrode through a resistor 69, the other terminal of the bias potential being connected to resistor 68 and thence to cathode 64 to complete the control electrode circuit. Also connected to control electrode 65 is one terminal of a condenser 70 whose other terminal is connected by means of a control switch 71 to a source of triggering potential 72. The condenser 70 is adapted to be short-circuited by a switch 73 which is mechanically linked to the switch 71 and which is closed when the switch 71 is opened and vice versa. The control electrode 62 of high vacuum valve 58 is connected through a secondary 74 of a transformer 75 to the cathode 61 of valve 58. The valve 58 is of a structure which renders it capable of passing substantial current when it is thus biased to zero. Across resistor 68 is connected the timing circuit comprising resistor 76 and condenser 77. To the cathode 64 of arc-like valve 59 is connected the anode 78 of a second arc-like valve 79, the cathode 80 of said valve being connected by means of the primary 81 of transformer 75 to a point 82 on the voltage divider 57. The control electrode 83 of said arc-like valve 79 is connected to the junction between resistor 76 and condenser 77 and is also connected to the anode 84 of a third arc-like valve 85 whose cathode 86 is connected through a resistor 87 to the negative end of voltage divider 57. The control electrode 88 of said last-named arc-like valve 85 is connected through a secondary 89 of transformer 75 to a source of bias potential 90 which terminates in the negative end of voltage divider 57.

The operation of the pulsing device is as follows:

High vacuum valve 58 is normally in a condition to conduct, whereas arc-like valve 59 is normally maintained non-conductive by the bias potential 239. When control switch 71 is closed, condenser 70 charges, causing a positive pulse on control electrode 65 which fires arc-like valve 59, and thereby causes conduction through resistor 66, high vacuum valve 58, arc-like valve 59 and resistor 68. The current through resistor 68 causes condenser 77 to immediately start charging, thereby gradually raising the grid potential of arc-like valve 79, which is normally maintained non-conductive by means of the bias potential obtained from the section of voltage divider 57 below the tap 82. When the condenser 77 has charged to a sufficient positive potential, the arc-like valve 79 will fire, thereby sending a pulse through primary 81 of transformer 75 which in turn causes pulses in secondaries 74 and 89 of that transformer. The pulse in secondary 74 is of such a magnitude and direction as to cause high vacuum valve 58 to cease conducting, thereby terminating the current through resistor 66 and valves 58 and 59, and ending the direct current pulse to the clock. The pulse from secondary overrides the negative bias potential 90 which has maintained arc-like valve 85 in a non-conductive condition, and causes arc-like valve 85 to fire, thereby discharging timing condensor 77 and readying said condenser for another cycle. The off time, or period between pulses, is governed solely by the actuation of switch 71. The condenser 70 insures that only one pulse will be delivered per closure of switch 71, whereas the switch 73 provides a means of discharging condenser 70 so as to render it immediately available for initiating a second pulse on another closure of switch 71. Thus, on each closure of control switch 71, which might be any one of the control switches 49, 50, 51, 52 or 53 of Figure 3, a single direct current braking pulse is supplied to the appropriate clock.

In Figure 5, there is shown a second embodiment of the invention wherein the microphones are automatically deenergized at the expiration of the period allotted to each participant by means of switches actuated by the clocks 1, 2, 3, or 4, the moderator's microphone never being deenergized. This embodiment entails a circuit similar to that shown in Figure 3 except that microphones 1M, 2M, 3M and 4M are connected to the microphone load through the clock actuated switches 91, 92, 93 and 94. In parallel with these switches are arranged manually operated switches 95, 96, 97 and 98 which enable the controller to reenergize any microphone which has been automatically deenergized if for any reason he so desires. The large clocks 1, 2, 3, 4 and M and also the small groups of clocks 31, 32, 33, 34, 35 and 44 are actuated and deactuated by means of manually operated switches 49, 50, 51, 52, and 53, as was the case in the embodiment shown in Figure 3.

The operation of this semi-automatic embodiment of the invention is similar to that outlined with respect to the embodiment shown in Figure 3, save that there is no necessity for the controller to deenergize the microphones when their associated clocks indicate expiration of the allotted time, the clocks themselves accomplishing this function.

In Figure 6 is shown a fully automatic embodiment of the invention wherein the control station has been eliminated entirely, except for a small group of switches 95, 96, 97 and 98 which might be placed on the moderator's desk to enable him to reenergize at will any microphone which has become automatically deenergized. In this embodiment, the clocks 1, 2, 3 and 4 are again provided with switches 91, 92, 93 and 94 which will automatically deenergize their associated microphones on the expiration of the allotted period of time. The output from the microphones 1M, 2M, 3M, 4M and MM, in addition to feeding the microphone load through clock switches 91, 92, 93 and 94, and manual switches 95, 96, 97 and 98, as in the previous embodiment, also feed individual amplifiers, rectifiers and integrators 99, 100, 101, 102 and 103, which deliver an output to a comparator, clock actuator and deactuator 104, shown in detail in Figure 8. The comparator 104 will actuate that clock whose microphone is delivering an output, or will actuate that clock whose microphone is delivering the largest output in the event that two or more microphones are delivering an output. By thus automatically operating switches 49, 50, 51, 52 and 53, the comparator eliminates completely the necessity for a controller. As will be apparent, the alternating and direct current supplies to the clocks 1, 2, 3, 4 and M are supplied in the same manner as in the preceding two embodiments illustrated in Figures 3 and 5, but the groups of small clocks have not been shown in the interest of simplicity.

The operation of this embodiment is as follows:

The moderator initiates the program with the appropriate introductory matter and then designates one of the participants who starts the discussion. The comparator 104 will actuate the moderator's clock M until said first participant speaks, at which time the comparator will actuate that speaker's clock. Thereafter, the comparator will actuate the clock of the loudest speaker in case of a plurality of simultaneous speakers, and will maintain the actuation of the clock of the last speaker in the case of silence, it then being up to the moderator to speak to stimulate further discussion, thereby actuating his clock. At the termination of the time allotted a participant, the switch associated with his clock will automatically deenergize his microphone, which may be reenergized by the moderator through the agency of manual switches 95, 96, 97 or 98, should he so desire.

Any of the three foregoing embodiments of the invention will thus apportion equal periods of speaking time to a plurality of speakers who may speak at will, thereby assuring equitable distribution of time within a predetermined total time for the program. The invention also makes such apportionment and its progress continuously visible to the audience, to the speakers and to the moderator. It is important to note that the invention does not provide for mere actuation of the clocks during the time that the associated microphones are actuated, since this would result in simultaneous actuation of more than one clock thereby rendering the length of the program indefinite, but the invention provides for actuation of the clocks in response to actuation of the microphones only in a sequential manner.

Referring now to Figure 7, there is shown the diagram of a suitable amplifier 105, rectifier 106 and integrator 107. The amplifier 105, which is shown by way of illustrative example only, comprises a pentode 108 connected in a conventional circuit to amplify the input delivered to its control electrode 109, and to deliver such amplified input to a load resistor 110. Connected across load resistor 110 by means of a coupling condenser 111 is a half-wave rectifier 112 in series with a cathode resistor 113. Across said cathode resistor 113 is connected the integrator circuit comprising resistor 114 and condenser 115, the integrated direct current output being taken from condenser 115. The operation of the circuit will be obvious in that pentode 108 amplifies the audio signal in a well-known manner and the signal is then rectified by rectifier 112 and integrated by integrating circuit 114, 115, and the amplified, integrated output taken from condenser 115.

Referring now to Figure 8 wherein is shown the circuit of a suitable comparator, the outputs from the foregoing amplifier, rectifier and integrator circuits are fed to control electrodes 121, 122, 123, 124 and 125 of cathode followers 116, 117, 118, 119 and 120 of the comparator. The cathodes 126, 127, 128, 129 and 130 of said cathode followers are connected to ground by means of load resistors 131, 132, 133, 134 and 135 shunted by condensers 136, 137, 138, 139 and 140. The anodes 141, 142, 143, 144 and 145 of said cathode followers are connected in the usual manner to a supply of direct current, not shown. Connected between the cathodes 127 and 128 of cathode followers 117 and 118 is the winding 146 of a contact operating voltmeter or polarized relay 147, having a movable element 237 connected by means of resistor 148 to one terminal of a supply of direct current relay power. The other two terminals 149 and 150 of relay 147 are connected to opposite terminals of the winding 151 of a multi-contact relay 152, the terminal 150 being further connected to lowermost contact 153 of relay 152. Movable contact 154, which is associated with contact 153 of relay 152, is connected by means of connector 155 to the movable element 237 of relay 147 and to resistor 148. Thus, when cathode followers 117 and 118 have direct current signals from the integrator circuits impressed upon their control electrodes, voltages will appear across cathode resistors 132 and 133 and the higher of the two voltages will cause the movable element 237 of relay 147 to swing in its direction as shown in Figure 8. If cathode follower 117 is supplying the only or the higher voltage to winding 146 of relay 147, then the movable element 237 will contact terminal 149 which is connected to the upper contact of relay 151 which in turn is connected through connector 155 to one terminal of the source of direct current relay power. Since this does not complete the direct current power circuit to relay winding 151, relay 152 is not energized and its contacts remain in the position shown. If, on the other hand, cathode follower 118 is receiving the only or the stronger signal from the integrator circuits, then the movable element 237 of relay 147 will swing to the right and contact terminal 150, thereby completing a direct current power circuit to the relay winding 151 through connector 155, winding 151, terminal 150, movable element 237, and resistor 148. This energization of relay 152 closes contacts 153 and 154 to lock in relay 152 so that the movable element 237 of relay 147 may thereafter leave terminal 150 without deenergizing relay 152, said relay being deenergized only when the movable element 237 of relay 147 contacts terminal 149 to short the relay winding 151 through contacts 153 and 154. The cathode followers 119 and 120 are connected in a similar manner to a relay 156 having a winding 157, a movable element 158 and terminals 159 and 160. Terminals 159 and 160 are likewise connected to a relay winding 161 of a relay 190 having associated lock-in contacts 162 and 163. Relays 152 and 190 have additional movable contacts 164 and 165 which engage contacts 166 and 167 connected to the control electrodes of cathode followers 117 and 119 respectively. The movable contacts 164 and 165 are connected to additional cathode followers 168 and 169 which have in their cathode circuits a relay 170 having a winding 171 with a movable element 172 and terminals 173 and 174 connected in the same manner as the other groups of cathode followers. The terminals 173 and 174 are connected to a relay winding 175 of a relay 191 having locking contacts 176 and 177 and a further movable contact 178 with an associated contact 179. The movable contact 178 is connected to the control electrode 180 of a cathode follower 181. The cathode circuit of this latter cathode follower is operatively connected by means of a connector 240 to another polarized relay 182 having a winding 183 and movable element 184, the other side of relay winding 183 being connected to the cathode of cathode follower 116 which receives its input from the integrator associated with the moderator's microphone. Relay 182 has the usual terminals 185 and 186 associated with a relay winding 187 of a relay 199 having locking contacts 188 and 189. Associated with the contacts 164 and 166 of relay 152 and with the contacts 165 and 167 of relay 190 and with the contacts 178 and 179 of relay 191 are additional contacts 192, 193 and 194. The contact 192 is connected by means of a connector 195 to control electrode 123 of cathode follower 118 which receives its input from the integrator associated with microphone 2. The contact 193 is connected by means of a connector 196 to the control electrode 125 of cathode follower 120 which receives its input from the integrator associated with microphone 4. The contact 194 is connected by means of a connector 197 to the control electrode 198 of cathode follower 169 which receives its input through relay contacts 165 and 167 and connector 241 from the integrator associated with microphone 3. Each of the relays 152, 190, 191 and 199 has still another group of contacts 200, 201, 202; 203, 204, 205; 206, 207, 208; and 209, 210 and 211. Referring to relay 152, contact 202 is connected by connector 212 to contact 207 of relay 191, contact 200 is connected by connector 213 to an output terminal lead 214, and contact 201 is likewise connected through a connector 215 to an output lead 216. Referring now to relay 190, contact 203 is connected by connector 217 to an output lead 218, contact 204 is connected by connector 219 to contact 206 of relay 191, and contact 205 is connected by means of connector 220 to an output lead 221. Referring to relay 191, contact 208 is connected by connector 222 to contact 209 of relay 199. The remaining contacts 210 and 211 of relay 199 are connected to an output lead 223 and to an alternating current input lead 224 respectively. The lead 224 terminates in an alternating current power supply for the clocks, the other terminal of which is connected by means of lead 225 to the output end of the comparator.

At the output of the comparator, output lead 225, which comes directly from the alternating current power supply, is connected to one terminal of each winding of a group of relay windings 226, 227, 228, 229 and 230, the other terminals of which are connected to output leads 223, 216, 214, 221 and 218 respectively. These relays operate normally closed pairs of contacts 231, 232, 233, 234 and 235. Thus when the comparator energizes any one of output leads 223, 216, 214, 221 and 218 to supply alternating current power to the proper clock, it simultaneously causes energization of one of the relay windings 226, 227, 228, 229 or 230 which opens one of the pairs of contacts 231, 232, 233, 234 or 235 to remove direct current control potential from that pulser.

The operation of the comparator is as follows: With the relays in the position shown in Figure 8, which is the normal position at the very beginning of a program, none of the microphones is delivering an output, and the only clock receiving power is that of the moderator which is energized through contacts 210 and 211 of relay 199. As will be noted, energization of clock M also energizes relay winding 226 which causes contacts 231 to open, thereby removing control potential from the pulser associated with clock M. Each of the other pulser control relay windings 227, 228, 229 and 230 is deenergized, thereby leaving contacts 232, 233, 234 and 235 closed so as to supply direct current control potential to the respective pulsers.

If now microphone 1 is actuated, a signal is supplied from integrator 99 to the control electrode 122 of cathode follower 117, and likewise through contacts 166 and 164 of relay 152 to the control electrode 236 of cathode follower 168, and also through contacts 178 and 179 of relay 191 to the control electrode 180 of cathode follower 181. The signal on cathode follower 117 will cause movable element 237 to contact terminal 149 which, as previously described, causes no energization of winding 151 and thus causes no change in the contacts of relay 152. The signal on cathode follower 168 will cause movable element 172 to contact terminal 173 which for similar reasons will cause no movement of the contacts of relay 191. The signal on cathode follower 181 will cause the movable element 184 of relay 182 to contact terminal 186, thereby applying direct current power through connector 238 and resistor 239 to winding 187 of relay 199 whose upper terminal is connected by means of connector 240 to the other terminal of the direct current power supply. Energization of this relay 199 will cause opening of contacts 210 and 211, and closing of contacts 211 and 209, and will cause closing of locking contacts 188 and 189. The opening of contacts 210 and 211 will remove alternating current power from clock M, thereby allowing contacts 231 of relay winding 226 to close, supplying direct current braking power to said clock M. The clock 1 is now receiving alternating current power through a circuit which may be traced from power supply lead 224 through contacts 211 and 209, connector 222, contacts 208 and 207, connector 212, contacts 202 and 201, connector 215, and output lead 216. This supply of alternating current power will cause energization of relay winding 227 thereby opening contacts 232 to remove direct current control potential from the pulser associated with clock 1, clock 1 now being energized will remain energized by virtue of its lock-in circuit 188 and 189 until such time as some other microphone causes its clock to take control.

As may be seen in Figure 8, the outputs of the integrators associated with microphones 1 and 2 are compared by cathode followers 117 and 118, whereas the outputs of the integrators associated with microphones 3 and 4 are compared by cathode followers 119 and 120. The larger output in each instance is then fed to cathode followers 168 and 169 where they are compared and the larger fed to cathode follower 181. This last output to cathode follower 181 is then compared with the output of the cathode follower 116 associated with the moderator's clock M. The comparator thus assures that one clock, and only one clock, will at all times be energized, and that the participant can cause his clock to be energized by merely speaking into his microphone louder than the participant speaking at that time.

Referring now to Figure 6 which shows the circuit diagram for the fully automatic device, the output lines 223, 216, 214, 221 and 218 shown in Figure 8 would be taken out at the top of the comparator as shown in Figure 6. The switches 49, 50, 51, 52 and 53 of Figure 6 are diagrammatic representations of the final relay switches in the comparator which close the alternating current supply circuit. These switches are also diagrammatic representations of contacts 231, 232, 233, 234 and 235 in Figure 8 which initiate direct current control potential to the pulsers as is done by switch 71 in the illustrative pulser shown in Figure 4. The program is ordinarily initiated by the moderator which will cause actuation of his clock M by the comparator. The moderator ordinarily will then designate a participant to start the discussion and on this participant's speaking into his microphone, the comparator will actuate the necessary relays to cause actuation of his clock and deactuation of the moderator's clock. This participant's clock will continue to be actuated until the output from his microphone is lower than the output from any one of the other microphones. Thus if he continues to speak in a normal voice, another participant can cause actuation of his own clock only by speaking louder, but if the first participant ceases to speak, a much lower output from another microphone will cause that microphone's clock to be actuated and the original participant's microphone to be deactuated. When the various clocks have tolled the predetermined period of time, the respective microphones will be deenergized and those participants will be effectively cut off. Such a participant can thereafter only be allowed to speak by the moderator's closing one of the switches 95, 96, 97 or 98 which will override the clock switch which deenergized the microphone.

Although I have shown and described certain specific embodiments of my invention, I am fully aware that many modifications thereof are possible, and my invention is not to be restricted except insofar as is indicated by the scope and spirit of the appended claims.

I claim:

1. A program device of the class described comprising in combination; a plurality of microphones, a plurality of timing clocks equal in number to the number of said microphones and associated with said microphones, said clocks being so situated and of such a size as to be readily readable by an audience, clock actuating and deactuating means, microphone connector means, means for actuating each clock during such time as its associated microphone is delivering an output, means for disconnecting each microphone when its associated clock has run a predetermined total of time.

2. A program device of the class described comprising in combination; a plurality of microphones, a plurality of timing clocks associated with said microphones and equal in number to the number of said microphones, said clocks being so situated and of such a size as to be readily readable by an audience, clock actuating means to sequentially actuate each clock during the time its associated microphone is delivering an output, means to deactuate each clock when said microphone ceases to deliver an output, microphone connector means to disconnect each microphone when its associated clock has run a predetermined total time.

3. A device for sequentially apportioning a predetermined total period of actuation to a plurality of microphones and for making such apportionment and the progress thereof visible to a large audience, comprising in combination; a plurality of microphones, a plurality of large clocks associated with said microphones, said large clocks being so situated and of such a size as to be readily readable by an audience, a plurality of follower clocks associated with said large clocks in synchronism therewith, clock actuating means to sequentially actuate each large clock and its associated follower clock during the time its associated microphone is delivering an output, means to deactuate each large clock and its associated follower clock when its microphone ceases to deliver an output and at least one other microphone is delivering an output, microphone connecting means to disconnect each microphone when its associated clock has run a predetermined total time.

4. A program device of the class described comprising in combination; a plurality of microphones adapted to be actuated at the will of a plurality of speakers, a load connected to said microphones, a plurality of large clocks associated with said microphones and so situated so as to be readily readable by an audience, means to sequentially actuate said clocks during the time their associated microphones are actuated, and means to disconnect said microphones from said load when their associated clocks have run a predetermined total time.

5. In a device for equally and sequentially apportioning a predetermined total period of actuation to a plurality of energized microphones adapted to be actuated at will by a plurality of speakers and for making such apportionment and the progress thereof visible to a large audience, the combination comprising; a plurality of clocks associated with said microphones and being of such a size and so situated as to be readable by said audience, means for actuating said clocks in seriatim during such times as their associated microphones are delivering an output, and means for deenergizing said microphones when said clocks have run their allotted portion of said predetermined total period of actuation.

6. In a device for equally and sequentially apportioning a predetermined total period of actuation to a plurality of energized microphones adapted to be actuated at will by a plurality of speakers and for making such apportionment and the progress thereof visible to a large audience, the combination comprising; a plurality of clocks associated with said microphones and being of such a size and so situated as to be readable by said audience, means for actuating said clocks in seriatim during such times as their associated microphones are delivering an output, and means actuated by said clocks for deenergizing said microphones when said clocks have run their allotted portion of said predetermined total period of actuation.

7. A program device of the class described comprising in combination; a plurality of microphones adapted to be actuated at will by a plurality of speakers, a load connected to said microphones through a first connecting means, a plurality of large clocks associated with said microphones, said clocks being of such a size and so situated as to be readily readable by an audience, an alternating current power supply for said clocks, a direct current braking supply for said clocks, a second connecting means connecting said alternating current supply and said clocks, a third connecting means connecting said direct current braking supply and said clocks, said second connecting means being operative to sequentially supply alternating current power to said clocks during such times as their associated microphones are actuated, said third connecting means being operative to supply direct current braking power to said clocks simultaneous with the disconnection of the alternating current power, and said first connecting means being operative to disconnect said microphones from said load when said clocks have run a predetermined period of time.

8. A device for sequentially apportioning a predetermined total period of actuation to a plurality of microphones and for making such apportionment and the progress thereof visible to a large audience comprising in combination; a plurality of microphones adapted to be actuated at the will of a plurality of speakers, a load connected to said microphones, a plurality of large clocks so situated and of such a size as to be readily readable by an audience, a source of alternating current power for said clocks, a source of direct current pulses to brake said clocks, means to sequentially supply alternating current power to each of said clocks when their respective microphones are actuated, said means including means to disconnect said alternating current power when said actuation ceases provided at least one microphone remains actuated, means to energize said source of direct current pulses simultaneously with disconnecting said alternating current power to supply a direct current pulse to the clock whose alternating current power is terminated, and means to disconnect said microphones from said loads when the respective clocks have run a predetermined total time.

9. A program device of the class described comprising in combination; a plurality of microphones adapted to be actuated at will by a plurality of speakers, a load connected to said microphones through a first connecting means including a group of switches, a plurality of clocks associated with said microphones and being so situated and of such a size as to be readily readable by an audience, an alternating current power supply for said clocks, a direct current braking supply for said clocks, second connecting means between said alternating current supply and said clocks including a group of switches closable one at a time, third connecting means between said direct current braking supply and said clocks including a group of switches closable one at a time, the direct current switch for a given clock being closable only when the alternating current switch for that clock is open, said second connecting means being operative to sequentially supply alternating current power to said clocks when their associated microphones are actuated, said third connecting means being operative to supply direct current braking power to said clocks when the alternating current power is removed, and said first connecting means being operative to disconnect said microphones from said load when said clocks have run a predetermined period of time.

10. A program device of the class described comprising in combination; a plurality of energized microphones adapted to be actuated at will by a plurality of speakers, a plurality of clocks associated with said microphones, said clocks being of such a size and so situated as to be readily viewable by an audience, means for comparing the magnitude of the output of said plurality of microphones, means for supplying motive power to each clock during such time its microphone is actuated provided only one microphone is actuated, said comparing means being operative during simultaneous actuation of a plurality of said microphones to cooperate with said means for supplying motive power to supply motive power to only that clock whose associated microphone is delivering the largest output, and means for deenergizing each microphone when its associated clock has run a predetermined total time.

11. A program device of the class described comprising in combination; a plurality of microphones adapted to be actuated at will by a plurality of speakers, means for comparing the magnitude of the output of said plurality of microphones, a load connected to said microphones through a first connecting means, a plurality of clocks associated with said microphones, said clocks being so situated and of such a size as to be readily viewable by an audience, an alternating current power supply for running said clocks, a direct current power supply for braking said clocks, means to connect said alternating current power to said clocks, means to connect said direct current power to said clocks, said means for comparing the magnitude of said microphone outputs being operative to cause connection of said alternating current power to the clock associated with the microphone delivering the output of the highest magnitude and also being operative to simultaneously disconnect said direct current power from said clock, and means for opening said first connecting means to any of said microphones when the clock associated with such microphone has run for a predetermined period of time.

12. A program device of the class described comprising in combination; a plurality of microphones adapted to be actuated at will by a plurality of speakers, means for comparing the magnitude of the output of said plurality of microphones, a load connected to said microphones through a first connecting means, a plurality of clocks associated with said microphones, said clocks being so situated and of such a size as to be readily viewable by an audience, an alternating current power supply for running said clocks, a direct current power supply for braking said clocks, means to connect said alternating current power to said clocks, means to connect said direct current power to said clocks, said means for comparing the magnitude of said microphone outputs being operative to cause connection of said alternating current power to the clock associated with the microphone delivering the output of the highest magnitude and also being operative to simultaneously disconnect said direct current power from said clock, and means actuated by said clocks to open said first connecting means to any of said microphones when the clock associated with such microphone has run for a predetermined period of time.

13. A program device of the class described comprising in combination; a plurality of microphones adapted to be actuated at will by a plurality of speakers, a plurality of clocks associated with said microphones, said clocks being of such a size and so situated as to be readily viewable by an audience, load means for said microphones, a first connecting means for connecting said microphones to said load means, an alternating current power supply for said clocks, a second connecting means for connecting said clocks to said alternating current supply, a direct current supply for said clocks, a third connecting means for connecting said clocks to said direct current supply, individual integrator means receiving an input from individual microphones, means for comparing the magnitude of the outputs of said integrator means, means associated with said comparing means to cause said second connecting means to connect said alternating current supply to that clock whose associated microphone is causing its integrator to deliver the largest output, a second means associated with said comparing means for causing said third connecting means to disconnect said direct current supply from said clock whose microphone is causing its integrator to deliver the largest output and for causing said third connecting means to supply direct current power to the remaining clocks, and means for causing said third connecting means to disconnect said microphones from said load when their associated clocks have run for predetermined periods of time.

14. A program device of the class described comprising in combination; a plurality of microphones adapted to be actuated at will by a plurality of speakers, a plurality of clocks associated with said microphones, said clocks being of such a size and so situated as to be readily viewable by an audience, load means for said microphones, a first connecting means for connecting said microphones to said load means, an alternating current power supply for said clocks, a second connecting means for connecting said clocks to said alternating current supply, a direct current supply for said clocks, a third connecting means for connecting said clocks to said direct current supply, individual integrator means receiving an input from individual microphones, means for comparing the magnitude of the outputs of said integrator means, means associated with said comparing means to cause said second connecting means to connect said alternating current supply to that clock whose associated microphone is causing its integrator to deliver the largest output, a second means associated with said comparing means for causing said third connecting means to disconnect said direct current supply from said clock whose microphone is causing its integrator to deliver the largest output and for causing said third connecting means to supply direct current power to the remaining clocks, means for causing said third connecting means to disconnect said microphones from said load when their associated clocks have run for predetermined periods of time, and means for reconnecting said disconnected microphones to said load at will.

15. A program device of the class described comprising in combination; a plurality of microphones adapted to be actuated at will be a plurality of speakers, a plurality of clocks associated with said microphones, said clocks being of such a size and so situated as to be readily viewable by an audience, load means for said microphones, a first connecting means for connecting said microphones to said load means, an alternating current power supply for said clocks, a second connecting means for connecting said clocks to said alternating current supply, a direct current supply for said clocks, a third connecting means for connecting said clocks to said direct current supply, individual integrator means receiving an input from individual microphones, means for comparing the magnitude of the outputs of said integrator means, means associated with said comparing means to cause said second connecting means to connect said alternating current supply to that clock whose associated microphone is causing its integrator to deliver the largest output, a second means associated with said comparing means for causing said third connecting means to disconnect said direct current supply from said clock whose microphone is causing its integrator to deliver the largest output and for causing said third connecting means to supply direct current power to the remaining clocks, and means actuated by said clocks for causing said third connecting means to disconnect said microphone from said load when said clocks have run predetermined periods of time.

16. A program device of the class described comprising in combination; a plurality of microphones adapted to be actuated at will by a plurality of speakers, a plurality of clocks associated with said microphones, said clocks being of such a size and so situated as to be readily viewable by an audience, load means for said microphones, a first connecting means for connecting said microphones to said load means, an alternating current power supply for said clocks, a second connecting means for connecting said clocks to said alternating current supply, a direct current supply for said clocks, a third connecting means for connecting said clocks to said direct current supply, individual integrator means receiving an input from individual microphones, means for comparing the magnitude of the outputs of said integrator means, means actuated by said comparing means to cause said second connecting means to connect said alternating current supply to that clock whose associated microphone is causing its integrator to deliver the largest output, a second means actuated by said comparing means for causing said third connecting means to disconnect said direct current supply from said clock whose microphone is causing its integrator to deliver the largest output and for causing said third connecting means to supply direct current power to the remaining clocks, and means actuated by said clocks for causing said third connecting means to disconnect said microphones from said load when said clocks have run for predetermined periods of time.

WILLIAM B. DOLPH.

References Cited in the file of this patent

UNITED STATES PATENTS

| Number | Name | Date |
| --- | --- | --- |
| 946,380 | Manson | Jan. 11, 1910 |
| 1,443,451 | Andersen | Jan. 30, 1923 |
| 1,480,403 | Littig et al. | Jan. 8, 1924 |
| 1,897,533 | Richey | Feb. 14, 1933 |
| 2,398,677 | Stockfeld | Apr. 16, 1946 |
| 2,539,754 | Rettinger | Jan. 30, 1951 |